(No Model.)

J. DEMAREST.
Water Closet.

No. 233,145. Patented Oct. 12, 1880.

Witnesses
Harold Serrell
Geo. T. Pinckney

Inventor
John Demarest
per Lemuel W. Serrell
atty.

UNITED STATES PATENT OFFICE.

JOHN DEMAREST, OF NEW YORK, N. Y.

WATER-CLOSET.

SPECIFICATION forming part of Letters Patent No. 233,145, dated October 12, 1880.

Application filed September 6, 1880. (No model.)

*To all whom it may concern:*

Be it known that I, JOHN DEMAREST, of the city and State of New York, have invented an Improvement in Water-Closets, of which the following is a specification.

The hopper or basin has been attached to the trap or to the sewer-pipe by flanges and bolts; but these are only adapted to water-closets in which the parts are of cast-iron. In instances where the water-closet basin or hopper is made of porcelain the flanges and bolts cannot be used on account of the liability to break the porcelain; but wooden wedges have been employed. These are liable to become loose in consequence of atmospheric action swelling and shrinking the same, and the pull of the closet, which operates the pan or valve, causes more or less concussion or vibration, and the parts work loose and gases escape at the joints.

My invention is for connecting the porcelain hopper to the sewer pipe or trap, and for connecting the pipes of the traps in such a firm and reliable manner that they cannot become loose by any jarring action to which the closet may be subjected, and when necessary the parts can be disconnected without being injured.

I make use of conical flanges around the tubular portions of the hopper and trap to be connected, and I provide clamps that are made hollow and the reverse of the flanges, so as to receive such flanges, and the clamps are drawn together by bolts, and hence they act to bind the two porcelain or earthen parts together and cause them to press upon the putty or other intervening cement, and at the same time encircle the joint and prevent one part of the joint moving upon the other part. I thus obtain the most perfect and reliable joint, because the cement is confined as well as the conical flanges, and the clamping-ring surrounds and supports the porcelain instead of tending to injure the same.

Figure 1:
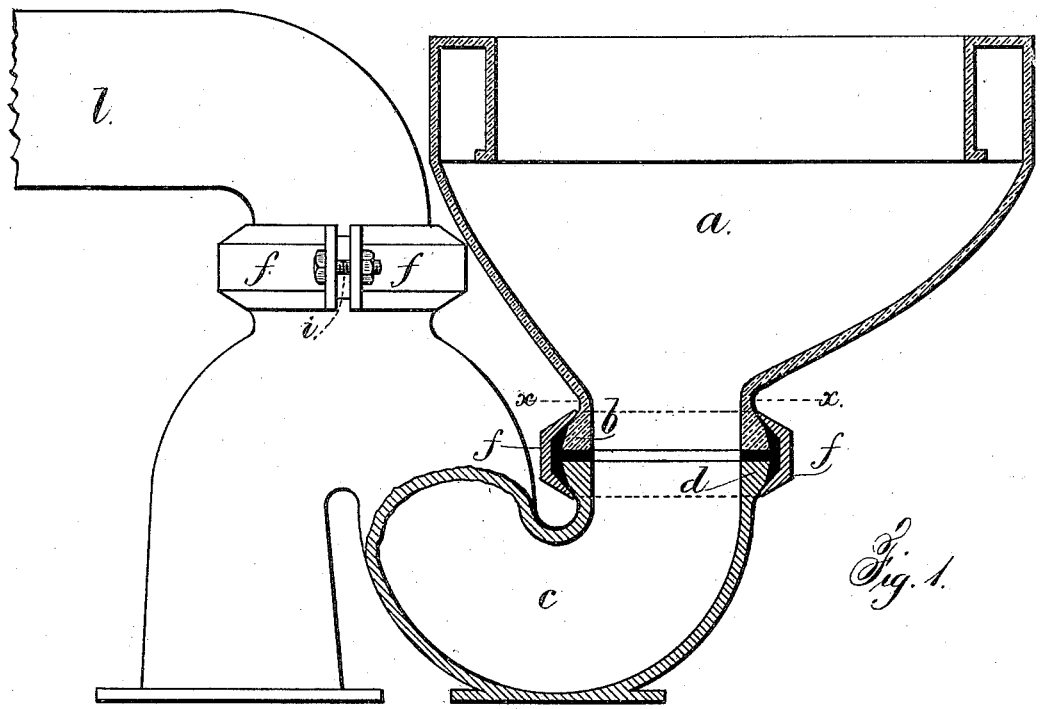
Figure 2:
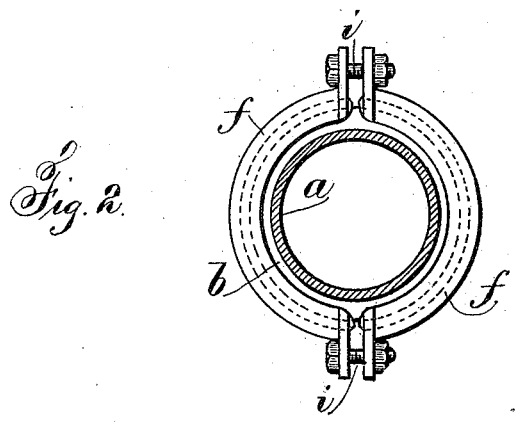

In the drawings, Figure 1 is a vertical section of the hopper or basin and the trap and its tubular connections, and Fig. 2 is a sectional plan view at the line $x\ x$.

The hopper or basin $a$ is of any usual or desired size or shape, and it is to be made of porcelain or other vitrified material. Around the outlet-opening of the said basin there is an external flange that is thicker at the inner than the outer portion, so as to form a conical rim or flange, $b$.

The trap $c$ is of an S shape, by preference, and may be of metal or porcelain. Its upper end is made with a conical flange, $d$, similar to the flange $b$. When these parts are placed together, putty or other suitable cement is introduced between the flanges, and the clamps $f\ f$ are placed around the flanges and drawn together by the bolts $i\ i$. These clamps $f\ f$ are half-rings of a trough shape sectionally, the hollow portion being inside, so as to set around and grasp the conical flanges, and the inclined portions of the clamps, acting upon the inclined portions of the flanges, force the parts together endwise upon the intervening cement, and at the same time the cement is confined by the ring-clamps. This holds the trap and basin firmly together and strengthens the joint, as aforesaid.

The trap and the sewer-pipe may be similarly connected. I have, however, shown the clamps and conical flanges upon the parts at the joint between the trap $c$ and the rising pipe $l$, that carries away smell from the closet or sewer-pipe.

I claim as my invention—

The combination, in a water-closet, of the conical flanges $b$ and $d$, upon the parts to be united by putty or other cement, with the clamps $f\ f$, having internal inclined surfaces acting against the conical flanges, and bolts $i\ i$ for clamping the parts, as set forth.

Signed by me this 1st day of September, A. D. 1880.

JOHN DEMAREST.

Witnesses:
GEO. T. PINCKNEY,
HAROLD SERRELL.